United States Patent [19]

Lodi

[11] 4,179,735

[45] Dec. 18, 1979

[54] COMPUTER WITH AN ARRANGEMENT FOR CHANGING ITS WORKING ENVIRONMENT

[75] Inventor: Franco Lodi, Turin, Italy

[73] Assignee: Ing. C. Olivetti & C., S.p.A., Turin, Italy

[21] Appl. No.: 784,430

[22] Filed: Apr. 4, 1977

[30] Foreign Application Priority Data

Apr. 22, 1976 [IT] Italy .......................... 67965 A/76

[51] Int. Cl.$^2$ .............................................. G06F 9/18
[52] U.S. Cl. .................................................... 364/200
[58] Field of Search .......................... 364/200 MS File

[56] References Cited

U.S. PATENT DOCUMENTS

| | | | |
|---|---|---|---|
| 3,478,322 | 11/1969 | Evans | 364/200 |
| 3,599,176 | 10/1971 | Cordero, Jr. | 364/200 |
| 3,618,045 | 12/1971 | Campbell et al. | 364/200 |
| 3,891,974 | 6/1975 | Coulter et al. | 364/200 |

*Primary Examiner*—Harvey E. Springborn
*Attorney, Agent, or Firm*—Schuyler, Birch, Swindler, McKie & Beckett

[57] ABSTRACT

An arrangement is disclosed which enables the variation of the working environment of a computer comprising a working memory, a central processor unit and a plurality of peripheral units including an external memory. The arrangement comprises a switch having a plurality of positions associated with respective working environments and a logic control device responsive to the switch to introduce a group of microprograms, programs forming the operative system and at least one application program associated with the selected position of the switch from the external memory into the working memory. The programs and microprograms introduced into the working memory then are used to control the peripheral units in such a manner to establish different groups of functions, each group specializing the computer for the selected environment.

5 Claims, 10 Drawing Figures

DATA ENTRY TYPE FUNCTION KEYBOARD

| | END | WRITE | SEL FORMAT | ESCAPE | IN REC | SRCH REC | DISP | DEL REC |
|---|---|---|---|---|---|---|---|---|
| MODIFY | RESET | 7 | 8 | 9 | ADV REC | REV REC | | ERASE INPUT |
| SKIP | — | 4 | 5 | 6 | SKIP | ← | → | INS CHAR | DEL CHAR |
| | , | 1 | 2 | 3 | | ↙ | ↑ | ↓ | ROLL UP |
| | 0 | 00 | 000 | | ← | → | | ROLL DOWN |

FIG. 7

ACCOUNTING TYPE FUNCTION KEYBOARD

| \|←┘ | S4 | S3 | S2 | S1 | P7 | P3 | | |
|---|---|---|---|---|---|---|---|---|
| S5 | RESET | 7 | 8 | 9 | | P6 | P2 | | |
| S6 | — | 4 | 5 | 6 | S | P5 | P1 | | |
| ↵ | , | 1 | 2 | 3 | | P4 | P0 | | |
| | 0 | 00 | 000 | | | | | |

↗ UNUSED KEYS

FIG. 8

DISC READING ROUTINE

COMPUTER WITH AN ARRANGEMENT FOR CHANGING ITS WORKING ENVIRONMENT

FIELD OF THE INVENTION

The present invention relates to a computer with an arrangement enabling variation of the working environment of the computer which comprises a working memory adapted to record microinstructions, instructions and data, a central unit adapted to execute (by means of the use of the microinstructions) the processing operations on the data required by the instructions, a plurality of peripheral units and an external memory. More particularly, this arrangement is adapted for computers of small and medium size (micro- and minicomputers) which have become enormously widespread in recent years because of the technological progress introduced by the LSI (large scale integration) technique applied to logic circuits.

BACKGROUND OF THE INVENTION

The working environment of a computer is constituted by the whole complex of microprograms (known as firmware), programs constituting the operative system (known as system software) and application programs oriented for a given application (known as the system library), which enable the physical apparatus of which it is composed to solve specific classes of problems such as accounting problems, data collection problems (known as data entry), scientific problems, etc.

The machines on the market at the present time are sold by the maker together with a specific firmware/software environment which enables a specific class of concrete problems to be solved.

One therefore speaks of "scientific microcomputers," "accounting microcomputers," "data entry microcomputers," "terminal microcomputers" and so on.

It follows that the user of such machines, by acquiring one of them, can execute only and always that specific class of programs which is defined by the working environment associated with the machine.

Even if some of these microcomputers, such as, for example, scientific microcomputers, allow a series of special functions (such as, for instance, statistical functions, mathematical functions and others) to be introduced by means of a connectable external memory (of the read-only type, known also as ROM memories), they do not enable the working environment of the computer to be fully changed.

There is also known a computer having a plurality of independent instruction decoders in which each decoder enables a single instruction to be executed. By combining the decoders, it is possible to obtain various groups or sets of instructions according to the design requirements of the system. This computer does not allow the operator to vary the working environment according to the requirements demanded by the work to be executed.

SUMMARY OF THE INVENTION

According to the present invention there is provided a computer comprising a working memory adapted to record microinstructions, instructions and data, a central unit controlled by the microoinstructions for carrying out the processing operations on the data required by the instructions, and a plurality of peripheral units including an external memory, and an arrangement for changing the working environment constituted by the group of microprograms, programs forming the operative system and at least one application program of the computer, the said arrangement comprising a switch having a plurality of positions associated with respective working environments, and a logic control device responsive to the position of the switch as, in operation, to introduce selectively from the external memory into the working memory a group of microprograms, programs forming the operative system and at least one application program associated with the selected position and adapted to control the peripheral units in such manner as to establish different groups of functions each adapted to specialize the computer for the selected environment.

DESCRIPTION OF THE DRAWINGS

FIG. 7 shows the functions zone of the keyboard of FIG. 1 as used during data collection;

FIG. 8 shows the functions zone of the keyboard of FIG. 1 as used during accounting work;

DESCRIPTION OF THE INVENTION

In order to facilitate understanding of the invention, there will be described the structure of the computer and the operations that must be performed by an operator who has at his disposal the computer of FIG. 1.

Figure 1:
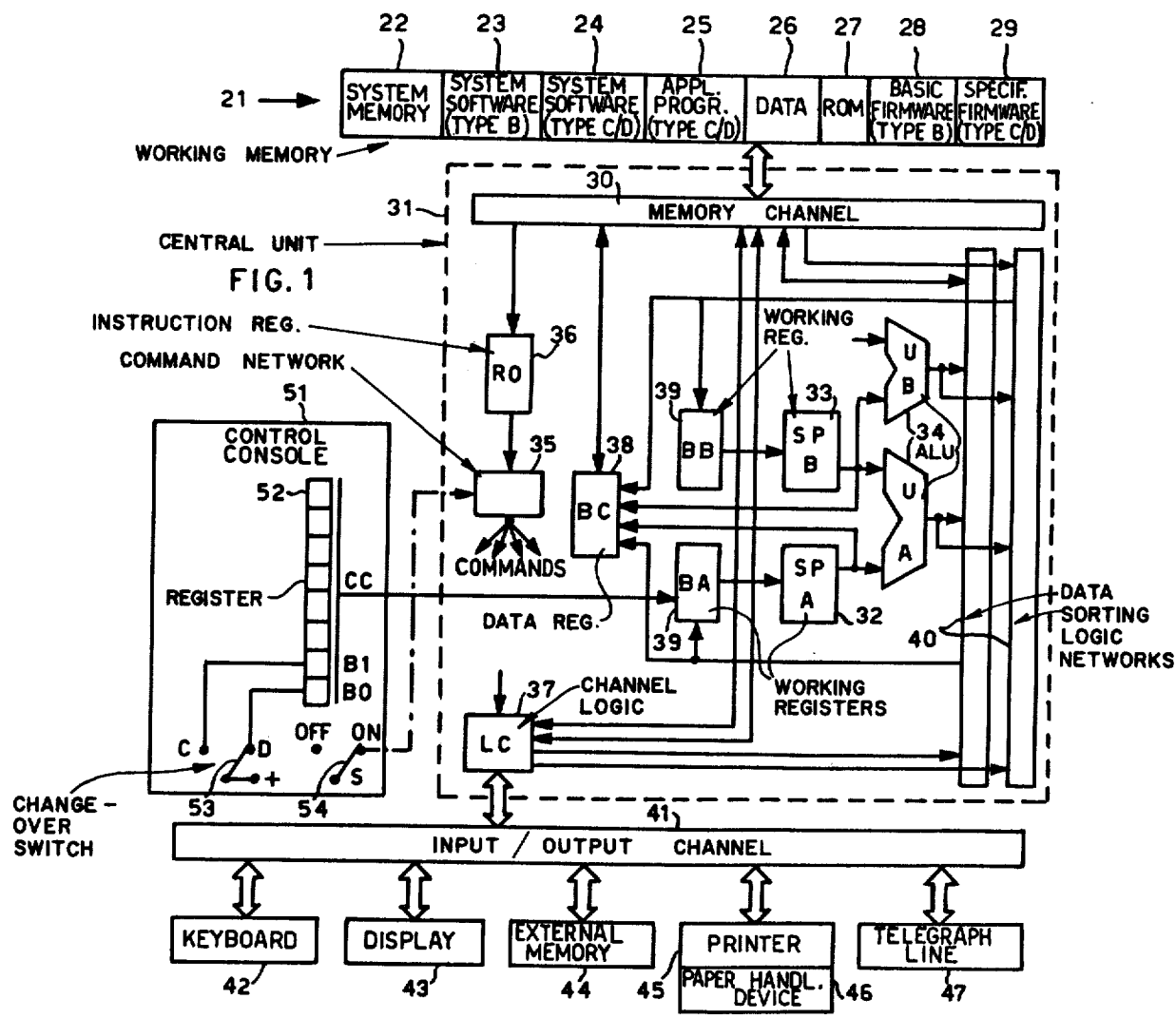
FIG. 1 represents a computer and arrangement embodying the invention.

More particularly, FIG. 1 shows:

(a) a working memory 21 which is adapted to record microprograms in the zones 27, 28 and 29, programs in the zones 23, 24 and 25, and data in the zones 22 and 26;

(b) a central unit 31 which is formed by working registers 32, 33 and 39, (SPA, SPB, BA and BB), an instruction register 36 (RO), a data register 38, (BC), an arithmetic and logic unit 34, (UA and UB), data sorting logic networks 40, channel logic 37 (LC) and a command generating network 35;

(c) a channel 30 which connects the memory 21 to the central unit 31;

(d) An input/output channel 41 which connects the central unit 31 with a plurality of peripheral units;

(e) the peripheral units may be, for example, a keyboard 42, a visual display unit 43, an external memory 44 (for example of the type having a magnetic disc), a printer 45 with a paper handling device 46 and a telegraph line 47 which enables connections to be made with a remote computer; and (f) a control console 51 which comprises a change-over switch 53 adapted to change the working environment of the computer, and a register 52 adapted to transmit the conditions selected by the operator (and among them also those of the change-over switch 53) to the central unit 31.

The command generating network 35 included in the central unit 31 is of the programmed type. In fact, it comprises a read-only memory (not separately shown) which is addressed by the microinstructions and supplies a string of bits which command the various parts which make up the central unit 31. This type of control unit is known in the art and puts the microinstruction principle into effect by applying it at the level of the logic circuits.

The computer shown in FIG. 1 enables the operator to select the working environment of the computer itself by means of the change-over switch 53. This is possible, as will be explained in detail in the continuation of the description, by loading into the memory 21 a first or a second group or set of microprograms, system programs and an application program which respectively define a first and a second working environment.

In the preferred embodiment shown in FIG. 1, the change-over switch 53 can select in the first position (indicated by the reference C) the working environment corresponding to accounting problems and in the second position (indicated by the reference D) the working environment corresponding to data collection problems. It is obvious that other forms of working environments are possible for the positions of the change-over switch 53 in order to satisfy other requirements of the market. Therefore, if the operator selects position D by means of the change-over switch 53, the computer is then specialized for data collection work, while if he selects position C by means of the change-over switch 53 the computer is then specialized for accounting work. The operator can therefore initiate data collection work only after having positioned the change-over switch 53 in position D. In this case, the memory 21 is initialized with a group of specific microprograms in the zones 24 and 29 which produce the working environment necessary for the operation of the data collection program loaded into the zone 25.

The operator is aided in the work of data collection by means of the visual display unit 43, which displays all the fields in which it is necessary to enter the data relating say to customers' orders.

The keyboard 42 assumes in this case a configuration which includes the special keys (of the type in FIG. 7) for handling the visual display unit 43 which assist the operator in the entry of the data by means of the alphanumeric keys.

When the operator has completed the introduction of an order (of the customer), he actuates an appropriate key and commands the recording in the external memory 44 of the data displayed by the visual display unit 43. When all the customers' orders have been recorded on the carrier of the external memory 44, the work of data collection is finished and the collected data is ready to be processed.

By means of the shifting of the change-over switch 53 into position C, the operator is able to change the working environment of the computer, specializing it for accounting work. In this case, the memory 21 is again initialized in the zones 24, 25 and 29, while the programs and microprograms recorded in the zones 23 and 28 remain unchanged.

The working environment of accounting type (which will also be referred to as of type C for brevity) permits efficient execution of the accounting program recorded in the zone 25 of the memory 21. Moreover, this environment provides a handling of the peripheral units 42 to 46 which is considerably different from the handling achieved by means of the working environment of data collection type (which will also be referred to as of type D for brevity).

In fact, the keyboard 42 will assume as special functions those shown in FIG. 8 (which will be explained hereinafter) and which serve to control the correct execution of the accounting work.

The visual display unit 43 has the function of informing the operator of possible abnormalities or requests for decisions. All the operating guiding functions for the introduction of the data present in the environment of type D are not now obtained, because they are not required by the environment of type C.

The printer 45 and the paper handling device 46 assume great importance, since the printing of the processed data is one of the specific tasks of the computer of accounting type.

The external memory 44 and the telegraph line 47 are handled in the same way by the two environments C and D.

The operator can therefore carry out the accounting work directly on the computer. In order to do this, he only has to shift the change-over switch 53 into position C and then initiate the accounting work on the data recorded in the external memory 44. The results of the processing operations can be printed on the printer 45 as they are obtained, or recorded in the external memory 44 again to be then sent to a remote computer by means of the telegraph line 47.

The logical arrangement of the data on the carrier of the external memory 44 will now be described with reference to FIG. 2. The term "flow" will be employed to denote a sequence of information, whether this is data or instructions.

The zones indicated by the reference 61 constitute flow labels which identify the initial points of corresponding indices recorded in the zones 92, 95, 98 and 100. Each flow label 61 is constituted by the zones 81, 82 and 83 shown in FIG. 4. The zone 81 contains the label character EF which assumes the significances given in Table 1.

TABLE 1

| Label EF | Type of flow |
|---|---|
| M | Microprograms (or Firmware) |
| S | System Programs (or System Software) |
| P | User Programs (or Program Library) |
| N | Data |

Figure 4:
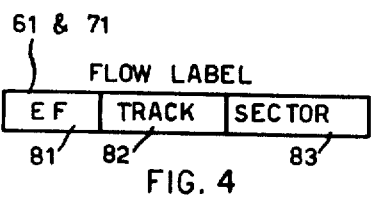
FIG. 4 shows the information recorded in a zone of FIGS. 2 and 3.

The zones 82 and 83 of FIG. 4 constitute the address of the corresponding index zone. This address is indicated symbolically by an arrow and by the letter M (or S, or P, or N) in FIG. 2.

Figure 2:
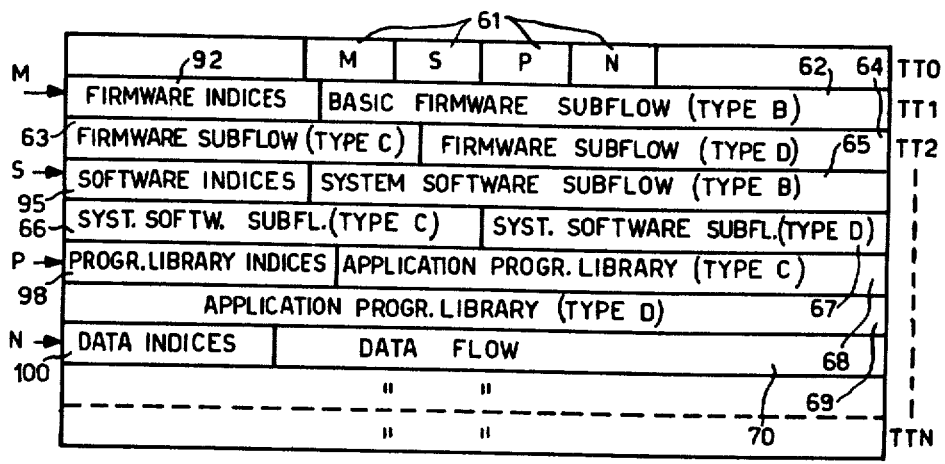
FIG. 2 shows the organization of the programs and microprograms on the support or carrier of the external memory.

The addresses contained in the zones 82 and 83 of the labels M, S, P and N of FIG. 2 are expressed by two numbers which indicate the track and the initial sector of the zone containing the indices associated with the flow identified by the label.

Figure 6:
FIG. 6 shows the information recorded in the indices of FIGS. 2 and 3.

The indices contained in the zones 92, 95, 98 and 100 are of the type shown in the zone indicated in FIG. 6, which is formed by the following information: the zone 87 contains a character SF which identifies a subflow within the limits of the flow; the significance of this character is given in Table 2.

TABLE 2

| Zone SF | Code | Type of record making up the subflow |
|---|---|---|
| B | 0000 0100 | Basic or common to a plurality of working environments (type B) |
| C | 0000 0010 | Special for environment of type C |
| D | 0000 0001 | Special for environment of type D |
| F | | End of the subflow |

The zone 88 contains the length LGT (expressed by a whole number of sectors) of the record belonging to the subflow;

The zone 89 contains the initial address of the zone of the working memory 21 reserved for loading that record;

The zones 90 and 91 constitute the initial address (expressed as a pair of two numbers which identify the track and the sector) of the record.

The indices contained in a zone are sufficient to address all the records contained in the flow associated with them.

For example, the indices contained in the zone 92 which identify the microprograms flow (or flow M) are sufficient to identify all the records contained in the zones 62, 63 and 64. In consequence, a first part of these indices will have SF=B (that is, they identify the basic firmware subflow), a second part will have SF=C (that is, the indices identify the accounting firmware subflow), and a third part will have SF=D.

The first and the second and the third parts all terminate with an index having the byte SF=F, which serves to indicate the end of the subflow.

The indices of the system software which are contained in the zone 95 are also divided into three parts identified by the characters B, C and D recorded in the zone 87 of the index. The parts B, C and D terminate with an index having the byte SF=F.

The indices of the application software which are contained in the zone 98 are divided into two parts identified by the characters C and D in the zone 87 of the index and terminate with an index having SF=F. On the other hand, the indices contained in the zone 100 can have any character recorded in the zone 87, inasmuch as this character has no significance for the flow of the data.

It is therefore possible, by checking the contents of the zone SF 87, to read selectively from the external memory 44 the subflow B, or the subflow C, or the subflow D.

The flows contained in the external memory 44 and given in FIG. 2 are listed in Table 3.

TABLE 3

| Zone | Contents | Type of Flow (cell SF of FIG. 6) |
|---|---|---|
| 62 | Basic firmware subflow | B |
| 63 | Accounting firmware subflow | C |
| 64 | Data collection firmware subflow | D |
| 65 | Generic system software subflow | B |
| 66 | Accounting software subflow | C |
| 67 | Data collection software subflow | D |
| 68 | Accounting application programs library flow | C |
| 69 | Data collection application programs library flow | D |
| 70 | Data flow | — |

The basic firmware subflow contained in the zone 62 is formed by the following microprograms:

Interpreter of the internal instructions (in language of assembly type);
interpreter of the general input/output instructions;
supervisor for the microinstructions;
handler for the external memory 44, the console 51 and the telegraph line 47;
minimum handler for the other peripherals (42, 43, 45 and 46) which serves to avoid blocking of the system due to peripherals which are not controlled.

The firmware subflows of type C and type D which are contained in the zones 63 and 64 are formed by the specific microprograms for handling the keyboard 42, the visual display unit 43, the printer 45 and the paper handling device 46.

These subflows differ in the way in which these peripheral units are handled. More particularly, the subflow of type C contains the complete handling of the printer 45 and of the paper handling device 46, and moreover the handling of the keyboard 42 is specialized by the functions shown in FIG. 8. The visual display unit 43 is handled on a smaller scale with respect to the handling of type D.

The subflow of type D contains the complete handling of the visual display unit 43, limited handling of the printer 45 and of the paper handling device 46, while the handling of the keyboard 42 is specialized for control of the visual display unit 43 by introducing the functions shown in FIG. 7.

The generic system software subflow contained in the zone 65 of FIG. 2 is formed by the following programs:

(1) Initializer for the system memory (indicated by the reference 22 in FIG. 1);
(2) program loader (also denoted LOADER);
(3) work planner (also denoted JOB CONTROL);
(4) handler for the external memory 44 and the telegraph line 47.

The accounting software subflow contained in the zone 66 is formed by the extensive-handling programs for the keyboard 42, the printer 45 and the paper handling device 46, and by the limited-handling program for the visual display unit 43.

The data collection system software subflow contained in the zone 67 is formed by the extensive-handling programs for the keyboard 42 and the visual display unit 43 and by the limited-handling programs for the printer 45 and the paper handling device 46.

The "application programs library" flow of type C contained in the zone 68 is formed by the compiler of an advanced language of the PL/1 type or the like and by programs of accounting type for carrying out invoicing operations, management of warehouses, the issue of orders, or the like.

The "application programs library" flow of type D contained in the zone 69 comprises a compiler program of an advanced language of the FPL (Field Programming Language) type for handling the visual display unit 43, and application programs which concern the various formats of the data to be introduced and the checks to be performed thereon.

With regard to the firmware and software subflows of types C and D, it has been explained that they carry out a differentiated handling of the peripherals of FIG. 1 in order to adapt them to the purposes required during accounting work and during data collection work.

As an example of differentiated handling of a peripheral unit, FIGS. 7 and 8 show the significance of the function keys during data collection work and accounting work, respectively. FIGS. 7 and 8 also include the numeric zone which does not concern the invention and will therefore not be mentioned in the continuation of the description.

The function keys of FIG. 7 are used for performing the functions given in Table 4. It is premised that the data collection working environment provides four operative states:
- data input or ENTER;
- verification or VERIFY;
- scanning or SCAN;
- modification or MODIFY.

Reference is made to these states in Table 4.

sions which relate to the working out of the program. These keys may be specialized by writing on them special wording or legends which concern the customer's work.

It is necessary to make it clear that the same keyboard 42 is used to provide both the functions zones shown in FIGS. 7 and 8. These zones are activated selectively by the actuation of the change-over switch 53.

More particularly, if the change-over switch 53 is in position C, the function keys perform in accordance with the function keyboard of FIG. 8 (accounting type) while, if the change-over switch 53 is in position D, the keys perform in accordance with the function keyboard

TABLE 4

| Key Name | Functions for data collection |
|---|---|
| SKIP | Signals the end of introduction of data and enables final checks |
| END | Concludes the current operative state |
| WRITE | Commands the writing of the current record in the external memory 44 |
| SEL FOR | Selects a format |
| ESC | Temporarily activates the SCAN state |
| MODIFY | Activates the modification of the field marked by a cursor on the visual display unit (in the SCAN state) |
| RESET | Erases the field and enables the keyboard 42 after an error |
| DISP | Visually displays a special working table |
| SEARCH REC | Activates the search for a record in the external memory 44 (in the SCAN state) |
| ERASE INPUT | Erases the record and enables reintroduction thereof |
| DEL REC | Deletes the current record (in the SCAN state) |
| INS REC | Creates space for the insertion of a record |
| ADV REC | Visually displays the following record (in the SCAN state) |
| REV REC | Visually displays the preceding record (in the SCAN state) |
| ROLL UP | Translates the screen by a line upwardly (SCAN or ENTER state) |
| ROLL DOWN | Translates the screen by a line downwardly (SCAN or ENTER state) |
| ↑← | Cursor to beginning of area of the visual display (SCAN state) |
| →\| | Cursor to beginning of following field (SCAN state) |
| \|← | Cursor to beginning of preceding field (SCAN state) |
| → | Cursor one step forward (ENTER, SCAN and MODIFY states) |
| ← | Cursor one step back (ENTER, SCAN and MODIFY states) |
| ↑ | Cursor one line back (SCAN state) |
| ↓ | Cursor one line forward (SCAN state) |
| INS CHAR | Inserts the character marked by the cursor (ENTER state) |
| DEL CHAR | Deletes the character marked by the cursor (ENTER state) |

In Table 4, there is understood by the term "cursor" a luminous mark on the visual display 43 which corresponds to the current position in which the character keyed or entered on the keyboard is written; moreover, the visual display 43 is divided into fields which define the zones in which the data introduced by the operator by means of the keyboard 42 is inserted; the format is a group of fields which have a predetermined sense, that is they represent, for example, the order of a customer.

The function keys shown in FIG. 8 relate to the functions carried out during the operation of the computer of FIG. 1 as an accounting machine. The keys are divided into two groups. The first group is formed by the seven keys named S0 to S6, which have the function of signalling to the central unit 31 the end of the current instruction for introduction of data from the keyboard.

At the end of the introduction of data, the program checks which of the keys S0 to S6 has been actuated. Obviously, each key has an internal significance which conditions the continuation of the processing operations.

The second group is formed by the eight keys P0 to P7, which are normally inhibited and are enabled by an appropriate instruction of the program. This enabling instruction for the keys P0 to P7 must be followed by an instruction for introduction from the keyboard which tests which of the keys has been actuated. The keys P0 to P7 are used by the operator to communicate deciof FIG. 7 (data collection type). The computer interprets the depression of the keys in accordance with its currently programmed environment.

The methods of signifying to the operator the different significances of the function keys on the keyboard 42 may be various. For example, a thin flexible cover may be used having over the function keys the inscriptions relating to the accounting type keyboard (shown in FIG. 8). The inscriptions relating to the data collection type are borne directly by the keys. The change from type D to type C is effected by actuating the change-over switch 53 and positioning the flexible cover over the function keys of the keyboard 42.

Establishment of the working environment

Briefly, the working environment is established on the switching-on of the computer of FIG. 1, taking account of the selection made by the change-over switch 53. The initial formation (also called initialization) is carried out by loading the zones 28, 29 and 23, 24, 25 in the working memory 21 successively with the programs and microprograms selected by the change-over switch 53.

During the operation of the computer, it is possible to change the working environment simpy by changing the position of the change-over switch 53. The condition set by the change-over switch 53 is recognized by the central unit 31 and causes the loading of the programs characteristic of the working environment selected.

Figure 9:
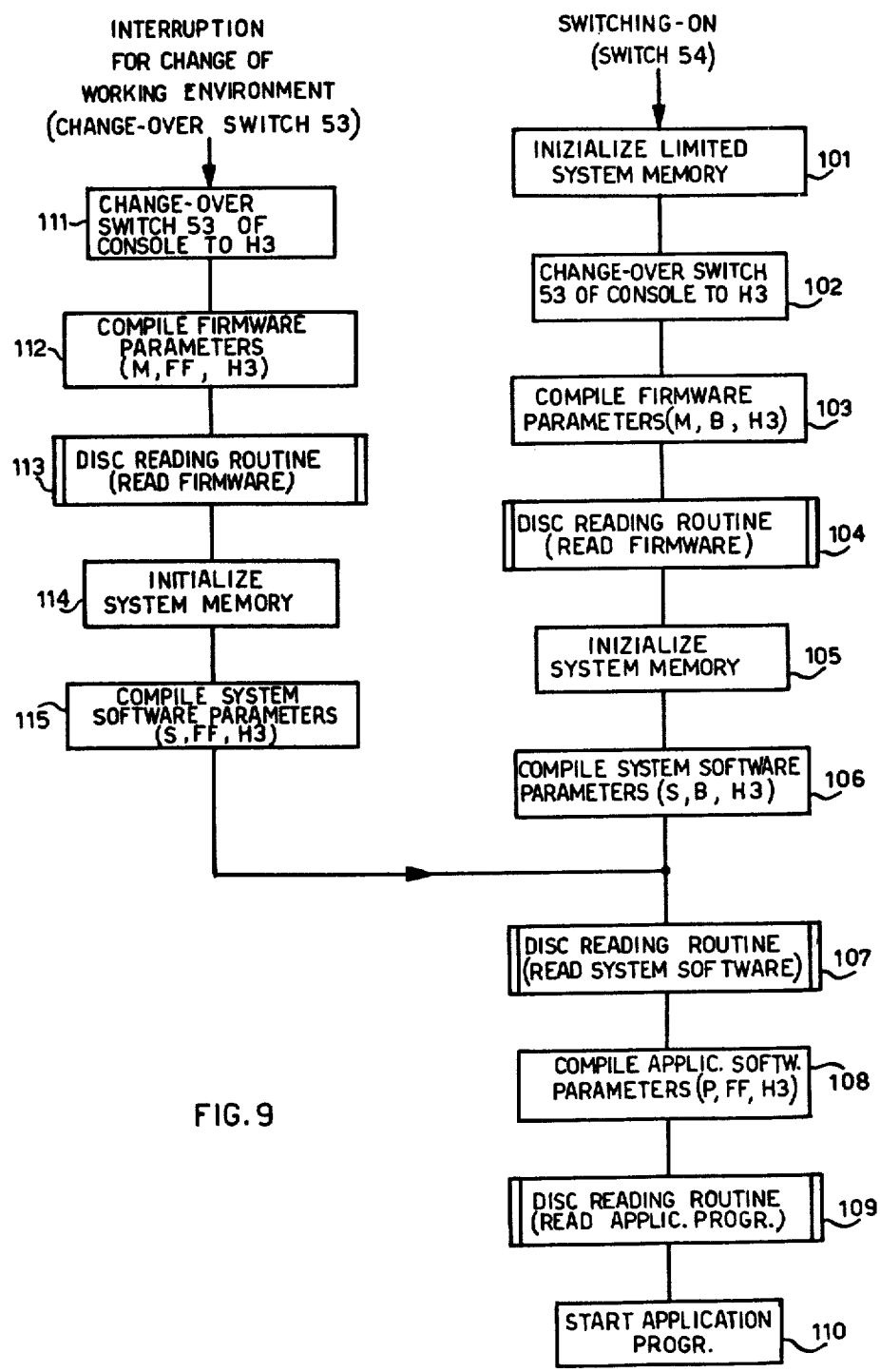
FIG. 9 is a flow diagram of the operations concerning the creation (initialization) and the variation of the working environment of the computer of FIG. 1.
Figure 10:
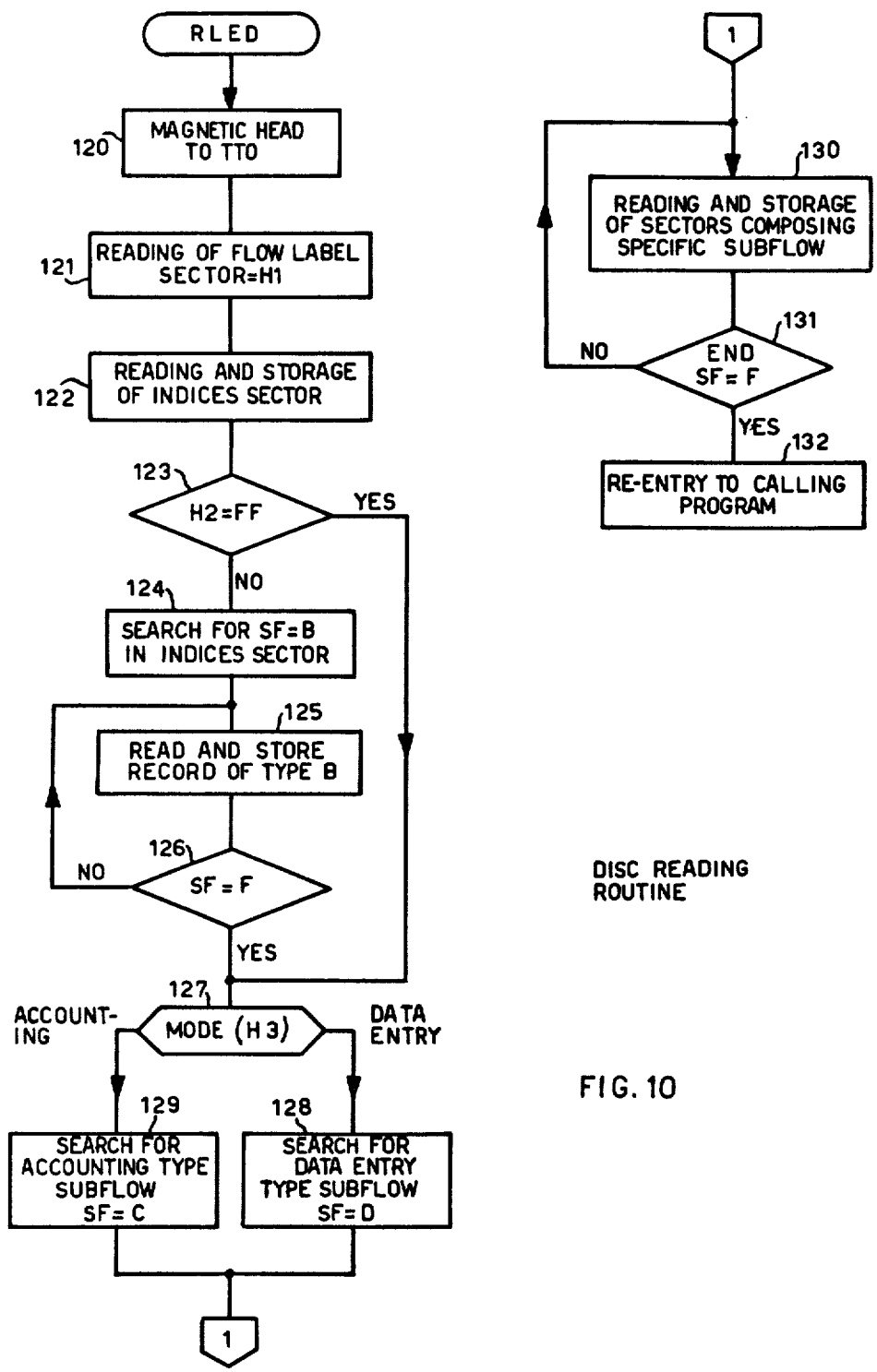
FIG. 10 is a flow diagram of the operations of reading the external memory and writing in the working memory of the computer of FIG. 1.

The formation and re-formation of the working environment are executed by the microprogram recorded in the zone 27 of the memory 21 and shown in the flow diagrams of FIGS. 9 and 10.

Figure 5:
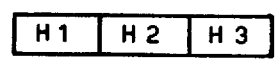
FIG. 5 shows some cells of the working memory of the computer.

This microprogram utilizes the memory cells H1, H2 and H3 shown in FIG. 5, which form part of the zone 22 of the memory 21. This zone 22 is called the system memory and contains the parameters used by the system firmwave and software. The cells H1 to H3 are compiled with the parameters which specify the loading into the memory 21 of the flows of programs and microprograms read from the external memory 44.

More particularly, the cell H1 contains one of the characters given in Table 1 and during the search for the flow to be loaded it is compared with the character contained in the flow label 81. When EF=H1, the label corresponding to the indicated zone of the flow sought has been found and then, by reading the address recorded in the corresponding zones 82 and 83 (FIG. 4), the reading of the index zone addressed into the memory 21 is commanded (this index zone is one of the following: 92, 95, 98, 100).

The cell H2 contains the character B if the flow to be loaded also provides the loading of a subflow common to the two working environments (type C and type D). If, on the other hand, the loading of a subflow of type B is not required, then the cell H2 is loaded with the hexadecimal character FF.

The character FF is recognized by the central unit 31 and serves to command directly the reading of the following subflow, excluding the search for the subflow of type B.

The cell H3 is loaded with the character C or D corresponding to the type of environment selected by the change-over switch 53. More particularly, the coding of these characters is as follows: C=0000 0010 and D=0000 0001, as shown in FIG. 1, in which the bits B1 and B0 of the console condition register 52 providing the condition code CC are set respectively by the positions C and D of the change-over switch 53.

It is made clear, moreover, that the contents of the console condition register 52 are periodically checked by the central unit 31 in order to verify consistency between the conditions required by the operator and the state of the program in process of execution. If this consistency is not found, there is an interruption of the program in progress and the starting of special routines for handling the interrupts.

In addition to the interruption of the program in progress, the conditions C and D produce the replacement of the current working environment by the alternative environment. It follows that the cause or reason for interruption produced by the actuation of the change-over switch excludes all other possible causes of interruption (except damage to the equipment), inasmuch as the program in progress in the current working environment will not be reinstated. This is normal inasmuch as at the instant of actuation of the change-over switch 53 the operator requires to change the working environment of the machine at his disposal and therefore the program in progress thereon is either terminated or it is not required that it be completed.

The microprogram which gives the working environment of the computer its form is shown in FIG. 9. This microprogram, as mentioned previously, is stored permanently in the zone 27 of the memory 21. The zone 27 of the memory 21 is implemented physically by means of LSI circuits of the permanent type (that is, it is a ROM memory).

When the general on-switch 54 is activated, a microinstruction is generated which loads into the memory addressing register BC 38 the address of the first microinstruction contained in the ROM 27. This microinstruction corresponds to the general resetting of the memory 21 and is the first operation executed by the block 101 of FIG. 9. The block 101 then executes the initialization of the system memory 22 sufficient for the minimum requirements relating to the instruction in the zones 28 and 29 of the corresponding microprograms.

More particularly, the block 101 defines in the system memory 22 the three cells H1 to H3 (shown in FIG. 5) which are necessary for containing the parameters required for recognizing the flows in the external memory 44 which must be written in the working memory 21.

The block 102 transfers the contents of the console condition register 52 to the cell H3 of the system memory 22. It follows, therefore, that the cell H3 contains the byte 0000 0010 if the change-over switch 53 is in position C and the byte 0000 0001 if the change-over switch 53 is in position D.

The block 103 compiles the cells H1 and H2 with the parameters necessary for reading the firmwave recorded in the zones 62, 63 and 64 of FIG. 2. H3 remains as established in block 102.

More particularly, in the cell H1 there is recorded the character M which serves the routine of FIG. 10 for identifying the flow label having the byte EF=M. In the cell H2 there is recorded the character B which serves to recognize the indices having the byte SF=B and therefore to enable the routine of FIG. 10 to load the respective microprograms into the zone 28 of the working memory 21.

The block 104 calls the reading routine of the external memory 44. This routine is shown in FIG. 10 and uses the parameters contained in the cells H1, H2 and H3 for reading the firmware flow to be transferred to the zones 28 and 29 of the working memory 21. The routine of FIG. 10 will be explained in detail in the continuation of the description.

The block 105 initializes the system memory 22 in its definitive configuration. It is made clear that by "definitive configuration" of the system memory 22 there is understood the configuration having the maximum capacity among those necessary for the use of the computer for data collection (type D) and those necessary for its use as an accounting machine (type C).

Moreover, the block 105 utilizes the information on the type of working environment selected by the change-over switch 53 (type C or D) to initialize the system memory 22 correctly. It follows that if the cell H3=C, the zones of the system memory 22 adapt themselves to handling the set of instructions which is specialized for accounting work, while if H3=D the zones of the memory 22 adapt themselves to handle the set of instructions which is specialized for data collection work.

The block 106 compiles the cells H1 and H2 with the parameters necessary for reading the system software recorded in the zones 65, 66 and 67 of the external memory 44. More particularly, in the cell H1 there is recorded the character S which serves the routine of FIG. 10 for identifying the flow label having the byte EF=S. In the cell H2 there is recorded the character B which serves to recognize the indices having the byte SF=B and therefore to permit the routine of FIG. 10 to load the respective programs into the zone 23 of the working memory 21.

The block 107 calls again the routine of FIG. 10 for executing materially the reading from the external memory of the programs constituting the system software, and the writing in the memory 21. If, for example, the change-over switch 53 is set in position C, then the programs recorded in the zones 65 and 66 of FIG. 2 are read from the external memory 44 and recorded in the zones 23 and 24 of the memory 21.

The block 108 compiles in the cells H1 and H2 the parameters relating to the transfer of the application program required by the type of working environment selected by the change-over switch 53. More particularly, in the cell H1 there is recorded the byte P which enables the routine of FIG. 10 to identify the flow label having the byte EF=P. In the cell H2 there is recorded the hexadecimal character FF (that is, the binary configuration 1111 1111) which enables the routine of FIG. 10 to exclude the search for a subflow common to the two types of environment types C and D).

The block 109 calls the routine of FIG. 10 again for executing the actual reading from the external memory 44 of the library program selected from the zone 68 or 69 according to the position of the change-over switch 53.

It is pointed out that the loading of the application program carried out by the blocks 108 and 109 of FIG. 9 is effected in a simple manner which does not require the intervention of the operator. This may be an advantage in the case of the smallest computers, but in general is restrictive inasmuch as it requires that the programs relating to the work programmed for a given day be prearranged from time to time in the zones 68 and 69.

A solution to this drawback is to start the loading program (LOADER) immediately after the loading of the system software (block 107). The LOADER requires the operator to choose from among the application programs of the selected library which one it is necessary to load into the working memory 21. In this way, the computer adapts itself to any choice of programs in the limits of the libraries recorded in the zones 68 and 69 of FIG. 2. The block 110 initiates the execution of the application program loaded by the block 109.

The operator of the computer executes the work associated with the program loaded according to the working environment defined by the change-over switch 53. If required, at the end of the program, the operator actuates the change-over switch 53 to execute a new application program which requires the working environment to be changed. As mentioned hereinbefore, the actuation of the change-over switch 53 produces an interruption of the program, this being effected by a jump to the block 111 of the microprogram of FIG. 9.

The block 111 transfers the contents of the register 52 to the cell H3 of the system memory 22. The block 112 is then executed, which compiles the parameters relating to the loading of the specific firmware selected by the change-over switch 53. More particularly, in the cell H1 there is written the character M, which enables the flow label having the byte EF=M to be identified. The cell H2 is loaded with the character FF (hexadecimal), which enables the part of the firmware contained in the zone 62 of the external memory 44 to be excluded from the loading process. The block 113 calls the routine of FIG. 10, which executes the transfer of the specific firmware selected by the cells H1 and H3 to the zone 29 of the memory 21.

The block 114 initializes the system memory 22 again to adapt it to the new working environment specified by the cell H3. The block 115 compiles in the cells H1 and H2 the parameters relating to the loading of the system software. The cell H1 is loaded with the character S which enables the flow label having the byte EF=S to be identified. The cell H2 is loaded with the hexadecimal character FF which enables the part of the system software contained in the zone 65 of the external memory 44 to be excluded from the loading process.

It is pointed out that the blocks 111 to 115 differ from the corresponding blocks 102 to 106 solely in the character written in the cell H2 during the compilation of the loading parameters. While the blocks 103 and 106 put H2=B, the blocks 112 and 115 put H2=FF (hexadecimal). This is due to the fact that whereas the blocks 102 to 106 initialize the computer, which is previously switched off, the memory 21 being therefore completely empty, the blocks 111 to 115 recognize the new condition selected by the change-over switch 53 and therefore relate to an already initialized computer. Consequently, while the blocks 102 to 106 also load the parts (of type B) common to the two working environments, the blocks 111 to 115 load only the specific parts (type C or D).

The reasons why the blocks 111 to 115 exclude the parts of type B from the loading are due to the necessity for reducing the time necessary for the restructuring of the working environment. If the need for reducing the time for restructuring the working environment does not exist, then it is possible to eliminate the blocks 111-115 from the microprogram and repeat the sequence of blocks 102 to 106 at each actuation of the changeover switch 53. In such case, the blocks 111 to 115 are replaced by the blocks 102 to 106 which, as has been said, repeat the loading of the firmware and the system software of type B. From block 107 to block 110 there are in any event repeated the same operations as are executed during the stage of switching on which have been previously explained.

As has been mentioned hereinbefore, the blocks 104, 107, 109 and 113 of FIG. 9 call a routine (also stored in the zone 27 of the memory 21) which reads the flows (specified by the parameters stored in the cells H1, H2 and H3 of the zone 22) of programs and microprograms from the disc and transfers them to the memory 21.

The flow diagram of this routine is shown in FIG. 10. This relates to the case where the recording support of the external memory 44 is of the magnetic disc type. When the routine of FIG. 10 is executed, the block 120 positions the magnetic head (not shown) on the zero track (indicated by TT0 in FIG. 2).

The block 121 reads the sector containing the byte EF=H1 compiled by the blocks 104, 107, 109 and 112 of FIG. 9 and transfers it to a zone of the system memory 22. More particularly, the blocks 104 and 112 transfer the flow label having the byte EF=M, the block 107 transfers the flow label having the byte EF=S and the block 109 transfers the flow label having the byte EF=P.

The block 122 transfers to the system memory 22 the indices sector identified by the address contained in the flow label. This address is formed by the pair (track, sector) as shown in FIG. 4.

The logical decision 123 checks the contents of the cell H2. If the cell H2 contains the hexadecimal configuration FF, a jump is made to carry out the logical decision 127, otherwise the block 124 is executed.

The block 124 searches among the indices transferred to memory by the blocks 122 for those having the byte SF=B, that is, those which relate to subflows common to the two working environments. It is necessary to make it clear that the indices stored in the zones 92 and 95 are arranged in sequences of the following type (B, C, D and F are the values of the byte SF):

B(1), B(2), ..., B(L), F, C(1), C(2), ..., C(M), F, D(1), D(2), ..., D(N), F in which L, M, N are the number of records constituting the subflows of types B, C and D, respectively.

The block 125 transfers the record identified by the index found to the memory 21. The identification of the record is made on the basis of the address of the record (track, sector) on the support, the length (number of sectors) and the initial address of the memory 21 assigned to the record. All these items of information are associated with each index as shown in FIG. 6.

The logical decision 126 checks whether the current record is the last of the subflow. This is done by verifying whether the byte SF of the index of the next record is equal to F. In the positive case (SF=F), the transfer of the subflow is at an end, otherwise a return is made to execute the block 125, which transfers the next record.

When all the records which make up the subflow of type B have been transferred, the machine goes on to execute the logical decision 127. The logical decision 127 checks the contents of the cell H3. If H3=C, the machine goes on to execute the block 129, while if HD=D it goes on to execute the block 128.

The block 129 searches among the indices stored in the system memory 22 for those having the byte SF=C, that is, it identifies the indices corresponding to the subflow of accounting type. The block 128, on the other hand, searches for the indices having the byte SF=D, that is, it identifies the indices corresponding to the subflow of the data collection type.

The block 130 reads from the external memory, and transfers to the working memory, a record which is a component of the specific subflow of type C or D according to whether the block 129 or 128, respectively, has been executed.

The logical decision 131 checks whether the current record is the last of the subflow. This is done by checking whether the byte SF of the index of the next record is equal to F. In the positive case (SF=F), the transfer of the subflow is at an end, otherwise a return is made to execute the block 130, which transfers the next record.

When SF=F, the machine goes on to execute the block 132, which transfers control to the calling microprogram, that is, to the block 105 after having read the firmware flow; to the block 108 after having read the system software flow, to the block 110 after having read the application program, or to the block 114 after having read the firmware flow commanded by the actuation of the change-over switch 53.

Figure 3:
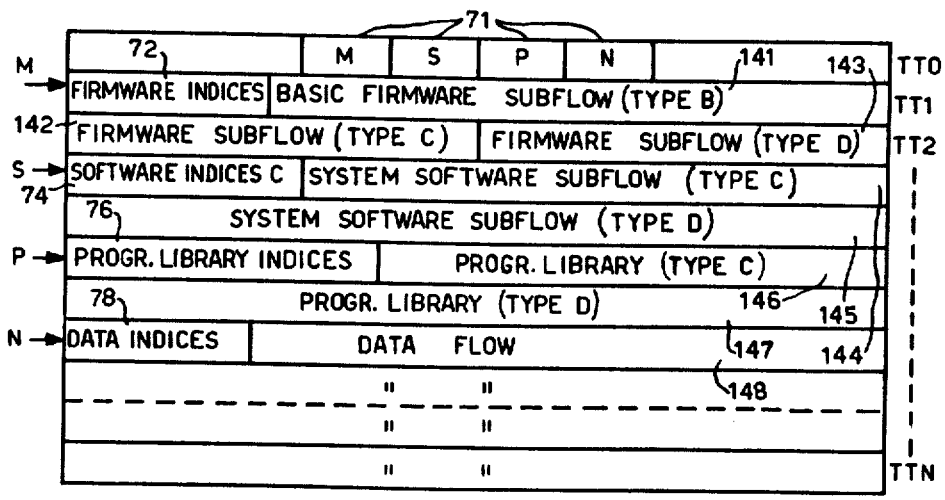
FIG. 3 shows a variant of the organization of FIG. 2.

A variant of the described arrangement will now be discussed briefly with reference to FIG. 3. The organization of the external memory 44 shown in FIG. 3 differs from the organization of FIG. 2 solely in the different arrangement of the system software. In fact, while the system software in FIG. 2 is composed of three subflows, that is:

a subflow of type B recorded in the zone 65;
a subflow of type C recorded in the zone 66; and
a subflow of type D recorded in the zone 67;

in FIG. 3 the system software is composed of two subflows:

a subflow of type C recorded in the zone 144; and
a subflow of type D recorded in the zone 145.

In order to be actually realizable, the arrangement of FIG. 2 imposes two requirements:

(1) that the environment of type C and the environment of type D have a large part of the operative system in common.

(2) that there are peripheral units handled solely by the software of type B.

Requirements (1) and (2) are compatible with the computer of FIG. 1 if the system software originates expressly for this computer.

If this is not so, that is if it is desired to utilize the system softwares available in two existing machines, this is possible by using the organization of FIG. 3. In fact, in this case, there corresponds to the actuation of the change-over switch 53 the loading of a software environment which may have nothing in common with the preceding software environment. Obviously, the organization of FIG. 3 still allows there to be common programs between the environment of type C and that of type D. In this case, the common programs are recorded both in the zone 144 and in the zone 145.

In order to utilize the organization of FIG. 3, it is sufficient to modify the program of FIG. 9 in the following manner. In compiling the parameters of the system software, the block 106 loads the hexadecimal configuration FF into the cell H2 instead of the character B. By so doing, the routine of FIG. 10 does not search among the indices of the zone 74 for those having the byte SF=B (block 124 of FIG. 10), but jumps directly to the block 127. Starting from the block 127, the subflow of type C or type D is loaded (according to the position of the change-over switch 53). All the other operations described in relation to the organization of FIG. 2 remain valid also for the organization of FIG. 3.

The present detailed description has been given citing as an example the case of a computer having two working environments. The extension of the arrangement described to more working environments is obvious. In order to handle three working environments, (for example), it is sufficient to have available a change-over switch having three positions to which there correspond three signals which set three flip-flops of the register 52.

The memory cells H1, H2 and H3 have the same significance as has been described and the cell H3 moreover assumes a significant configuration for each working environment. For example, the cell H3 may assume the significances given in Table 5.

TABLE 5

| Cell H3 | Register 52 | Environment |
| --- | --- | --- |
| C | 0000 0010 | Accounting applications |
| D | 0000 0001 | Data collection applications |
| SC | 0000 0100 | Scientific applications |

The memory 21 is divided exactly as described hereinbefore in connection with FIG. 1.

The external memory 44 may be divided as shown in FIG. 2 or in FIG. 3, with the modification that instead of the number of specific subflows being solely of two types (types C and D) in FIGS. 2 and 3, it is of three types (C, D and SC).

The microprogram for the transfer of flows which is shown in FIG. 10 is modified only in the logical decision 127 which examines the contents of the byte SF belonging to the indices. In this case, the cell H3 may contain one of the three types codes (C, D and SC) shown in Table 5. Obviously, the functions zone of the keyboard also assumes three significances, two of which are shown in FIGS. 7 and 8, while the third will be that which is specific for the scientific applications.

The functions required by the scientific applications are, for example: sine, cosine, tangent, exponential function, root, logarithm, etc. As has been said, these functions may be added on the keyboard 42 by means of a transparent plastics cover having the inscriptions of the functions to be implemented corresponding to the working environment selected by the change-over switch.

What we claim is:

1. A computer system for processing data under control of different selectable information groups each corresponding to a different working environment, each information group being defined by an operating system program, at least one application program and a plurality of microprograms associated with the operating system and application programs, said computer system including a working memory for storing an information group, a central processing unit controlled by the information group stored in said working memory for processing data and a plurality of peripheral units selectively connectable to said central processing unit according to the operating system program of the information group stored in said working memory, said plurality of peripheral units being controlled by said central processing unit in accordance with the application program of the information group stored in said working memory, said plurality of peripheral units including an external memory for storing a plurality of information groups corresponding to different working environments, the improvement comprising:
   environment changing means coupled to said central processing unit for changing the working environment of the computer system by selectively connecting said peripheral units to said central processing unit to specialize said computer system for a desired working environment, wherein the information groups stored in said external memory include at least one program and microprogram common to all working environments and at least one program and microprogram specialized for the desired working environment, said environment changing means comprising:
   switching means having a plurality of positions each associated with a different working environment for selecting the desired working environment;
   group forming means controlled by said switching means for forming an information group from the programs and microprograms stored in said external memory including the programs and microprograms common to all working environments and the programs and microprograms specialized for the desired working environment; and
   loading means coupled to said group forming means and responsive to said switching means for introducing the information group formed by said group forming means into said working memory.

2. A computer system according to claim 1, wherein said switching means has two positions and said selection control means is controlled by the first and the second positions of said switching means for specializing the computer for a selected environment.

3. A computer according to claim 2, wherein said switching means is operable manually.

4. A computer system according to claim 1 wherein said group forming means comprises:
   a register arranged to recored one of a plurality of signals according to the position of said switching means; and
   testing means for testing the contents of said register to determine the position of said switching means, said loading means being responsive to said testing means for introducing said information group into said working memory.

5. A computer system according to claim 4, wherein said working memory includes at least two separate sections, said computer system comprising
   initializing means operable for activating said loading means to insert the programs and microprograms common to all working environments in a first one of said sections of said working memory and insert the programs and microprograms specialized for the desired working environment in a second one of said sections of said working memory.

* * * * *